C. A. LONGWELL.
DISCOUNT MACHINE.
APPLICATION FILED DEC. 9, 1907.
914,056.
Patented Mar. 2, 1909.
4 SHEETS—SHEET 1.
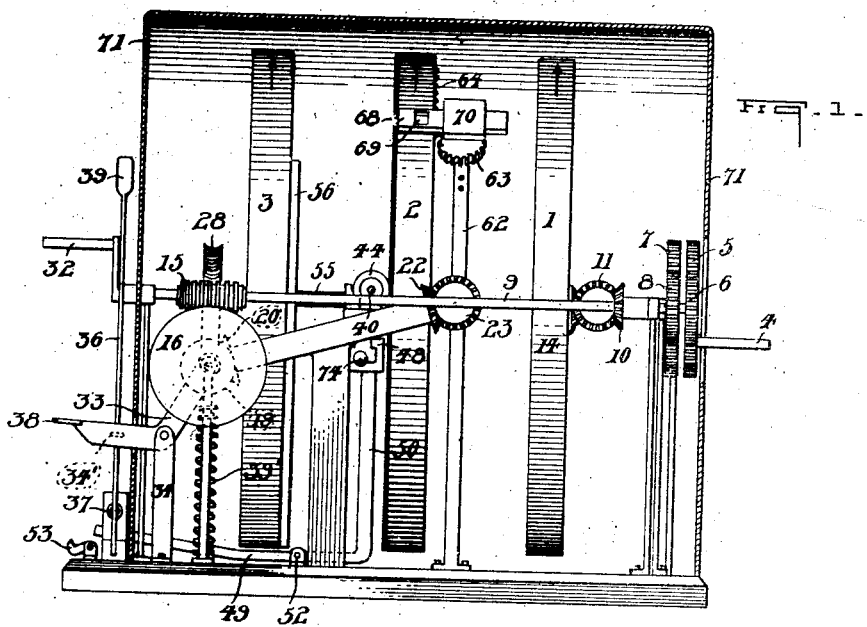
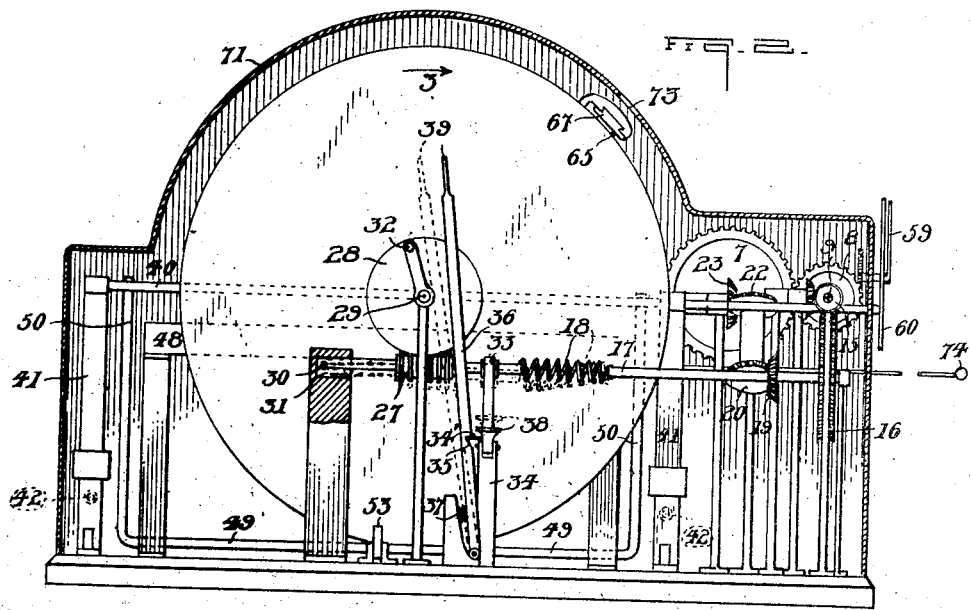
WITNESSES:
INVENTOR
C. A. Longwell
by F. N. Barber
ATTORNEY C. A. LONGWELL.
DISCOUNT MACHINE.
APPLICATION FILED DEC. 9, 1907.
914,056.
Patented Mar. 2, 1909.
4 SHEETS—SHEET 2.
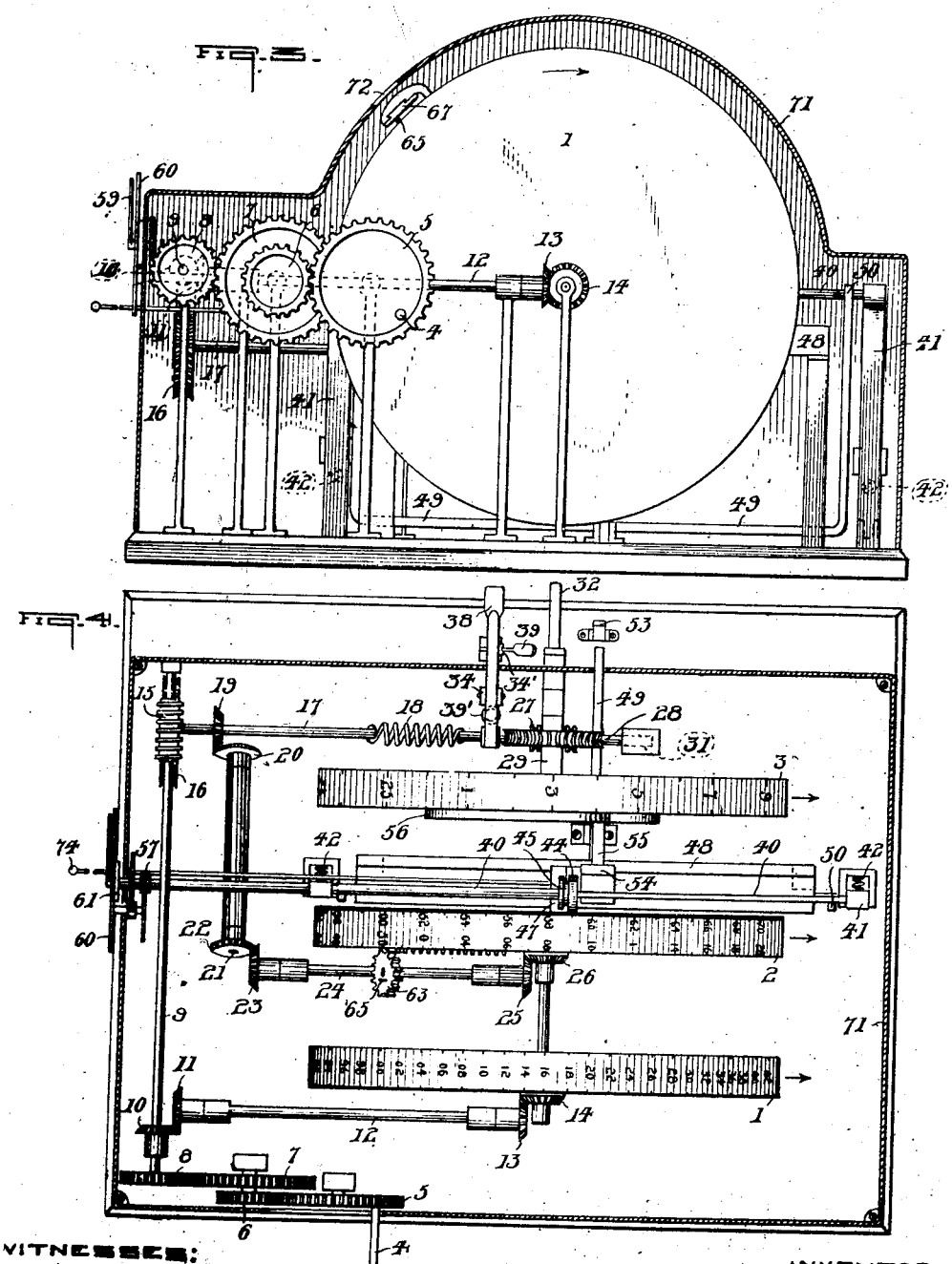

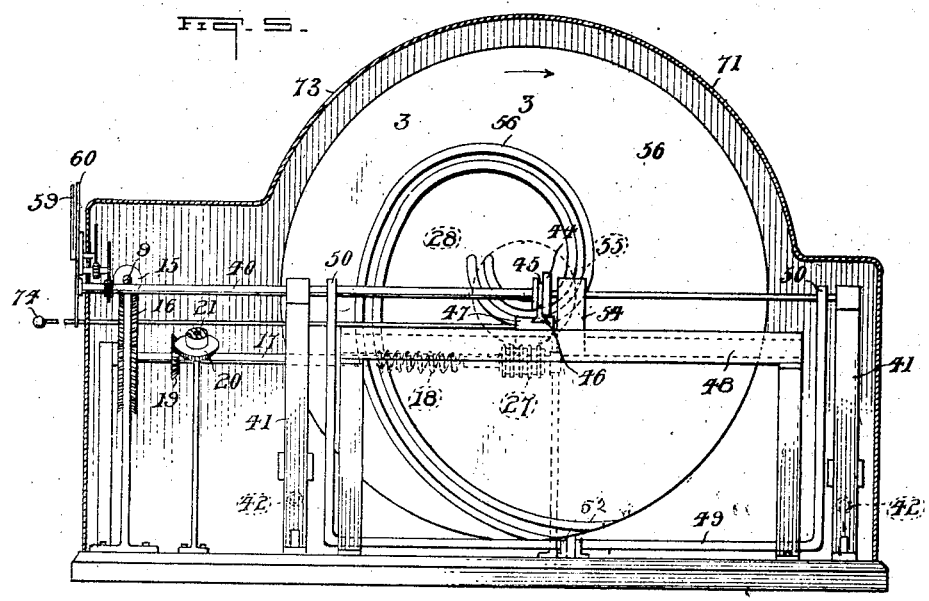

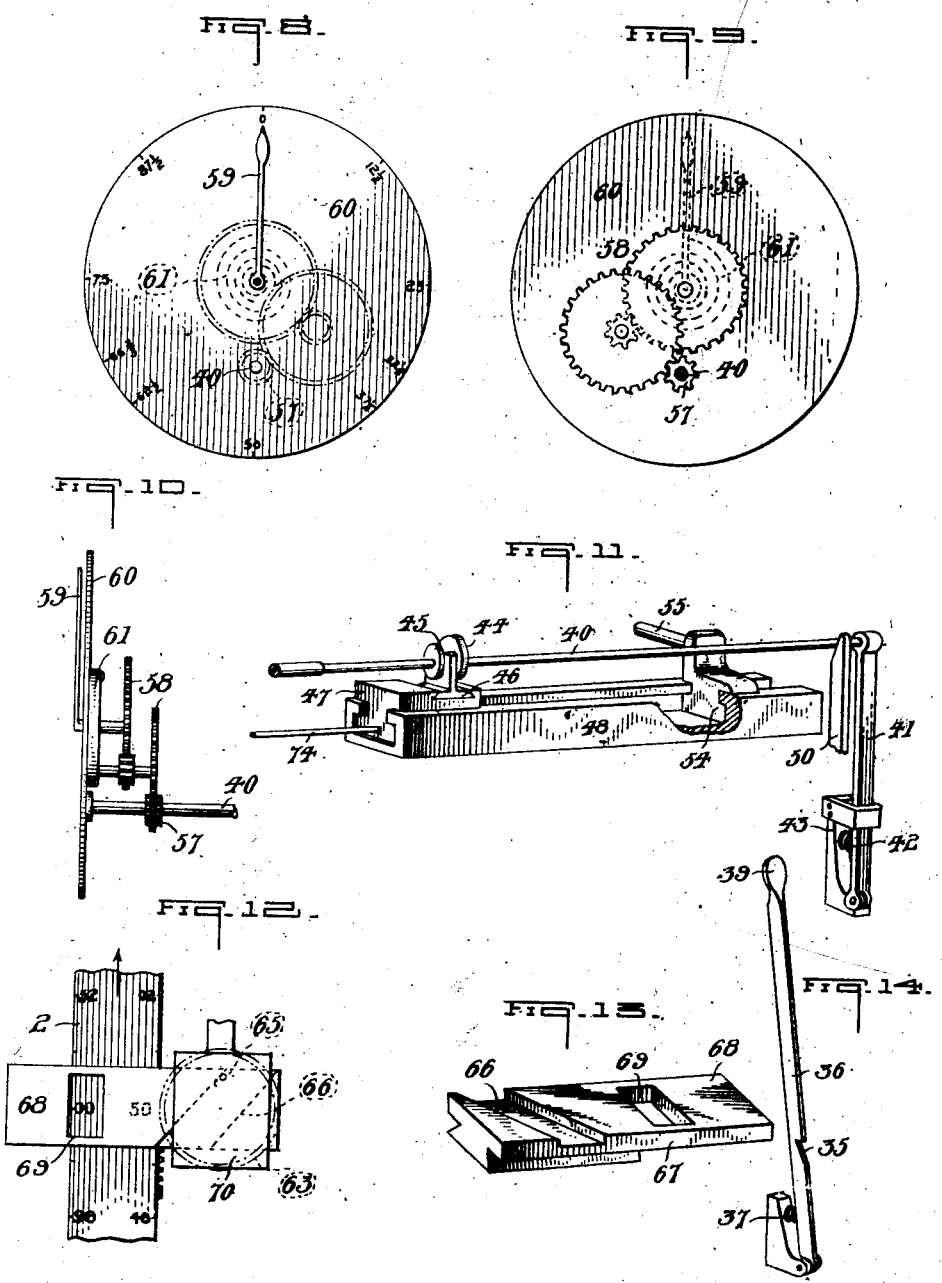

UNITED STATES PATENT OFFICE.

CHESTER A. LONGWELL, OF PITTSBURG, PENNSYLVANIA.

DISCOUNT-MACHINE.

No. 914,056.    Specification of Letters Patent.    Patented March 2, 1909.

Application filed December 9, 1907. Serial No. 405,662.

*To all whom it may concern:*

Be it known that I, CHESTER A. LONGWELL, a citizen of the United States, residing at Pittsburg, in the county of Allegheny and State of Pennsylvania, have invented new and useful Improvements in Discount-Machines, of which the following is a specification.

My invention relates to discount machines and has for its object to show the amount remaining of a principal sum after a discount or a series of discounts have been deducted. I provide an indicator which may be adjusted by the operator to show any desired per cent. of discount, the adjustment being obtained by a connection of the indicator with the indicator showing the sum to be discounted. The connections are such that when the percentage indicator shows the required percentage the other indicator will show the sum remaining after the percentage has been taken from the principal. In case other discounts are to be taken off in series, I can show the remainder left after each discount has been made.

Referring to the accompanying drawings, Figure 1 is a front elevation of a machine embodying my invention, the casing being in vertical section; Fig. 2, an elevation looking toward the right, the casing being in section; Fig. 3, an elevation looking toward the left, the casing being in vertical section; Fig. 4, a plan, with the casing in horizontal section; Fig. 5, a vertical section between the disks 2 and 3, looking toward the latter; Fig. 6, an elevation of a fragment of the machine showing the parts associated with the disk 2; Fig. 7, a view of Fig. 6, looking towards the right; Fig. 8, a front elevation of the percentage indicator; Fig. 9, a section showing the rear of the percentage indicator and reducing gears therefor; Fig. 10, a side view of the said indicator and gears; Fig. 11, a perspective, partly broken away, showing the controlling mechanism for said indicator; Fig. 12, an edge view of a part of the disk 2 and the shutter mechanism therefor; Fig. 13, a perspective view of the shutter; and Fig. 14, a perspective of the trigger lever and its support.

On the drawings, 1, 2, and 3, represent, respectively, the cents disk, the units and tens disk, and the hundreds disk, all in axial alinement.

4 is a handle on the gear 5 which meshes with the pinion 6 connected to and rotatable with the gear 7. The latter gear meshes with the pinion 8 on the shaft 9 which extends across the front of the machine. On the shaft 9 is the bevel gear 10 which coöperates with the bevel gear 11 on the shaft 12. The shaft 12 has thereon the bevel gear 13 in mesh with the bevel gear 14 connected so as to rotate the disk 1.

The shaft 9 is provided with the worm 15 which turns the worm-wheel 16 on the shaft 17, having thereon the flexible section 18 composed of a coiled spring. On the shaft 17 is the bevel gear 19 in gear with the bevel gear 22 meshing with the bevel gear 23 on the shaft 24. The shaft 24 is provided with the bevel gear 25 gearing with the bevel gear 26 carried by the disk 2. The shaft 17 has thereon the worm 27 which turns the worm wheel 28 on the shaft 29 carrying the disk 3. The rear section of the shaft 17 is seated in the standard 30 having therein the downwardly open slot 31 for the end of the said shaft, this slot permitting the rear section of the shaft to be bent down so as to disengage the worm 27 from the worm wheel, at which time the disk 3 can be independently rotated by the hand crank 32 on the shaft 29. The shaft 17 is locked in its upper position by the bell-crank lever 33 pivoted at its angle in the standard 34 and having its inner end supporting said shaft 17. The outer end of the lever 33 is provided with the lug 34' which normally lies in the notch 35 in the side of the trigger lever 36, pressed toward the lever 33 by the spring 37. The lever 33 is provided with the finger piece 38 and the lever 36 with the handle part 39. The spring 39' secured to the lever 34 draws down the rear end of the shaft 17 when it is free to move downwardly.

Between the disks 2 and 3 is the shaft 40 supported in the two oscillatory standards 41 pressed toward the disk 2 by the springs 42 held in place in the standards 43. The shaft 40 has splined thereon the friction gear 44 slidable thereon and normally in engagement with the left hand face of the disk 2. The gear 44 when at its forward limit rotates one revolution while the disk 2 rotates one revolution. This gear has in its hub the groove 45 to receive the bearing 46 slidable in the block 47 guided parallel with the shaft 40 by means of the guide channel 48. The bearing 46 may move transversely of the movement of the block 47 by reason of the dove-tail connection between the two as shown in Fig. 11.

49 is a forked lever having its inner parallel arms 50 in engagement with the right hand side of the shaft 40 and its middle portion pivoted on the ears 52. The outer end of the lever 49 may be locked down by the catch 53 to keep the gear 44 clear of the disk 2 when the latter is being reset and in order to permit the shaft 40 to rotate independently of the disk 2 as will be explained presently.

In the channel guide 48 is the block 54 having the pin 55, which rides in the curved, spiral guide groove 56 in the right hand face of the disk 3.

The shaft 40 has at its front end the gear 57 which through a set of reducing gears 58 rotates the percentage pointer 59 over the face of the dial 60, having thereon different percentage numerals as shown on Fig. 8. The spring 61 is wound up as the pointer rotates to the right, so that when the shaft 40 is free to rotate, as already described, the pointer will by said spring be returned to zero, its normal position (Fig. 8).

The standard 62 supports the inclined gear 63 in the path of travel of a few teeth 64 on the side of the disk 2. This gear has thereon the pin 65 which at certain times engages one wall or the other of the inclined slot 66 in the slide 67, which is guided by a dove-tail connection so as to travel transversely of the disk 2. The slide 67 carries or has connected thereto a portion 68 having therein the slot 69 to expose one of the two lines of numerals on the edge of the disk 2. The slide 67 is supported by the overhanging bracket 70 carried on the standard 62.

The whole mechanism is inclosed by the casing 71 which has the slots to disclose the numerals on the edges of the disks. On Fig. 3, the slot 72 discloses the edge of the disk 1, and on Fig. 5, the slot 73 discloses the edge of the disk 3.

74 is a rod extending through the front of the casing and secured to the block 47, so that the latter may be pushed into contact with the block 54.

Suppose now that the disks 1, 2, and 3 are set as shown in Fig. 4 with the "25" on the disk 3, the "00" and "50" on disk 2, and the "00" on the disk 1 all in line; that the slot 69 disclosed the "00" on the disk 2, as shown on Fig. 12; that the gear 44 is in its extreme forward position; and that the block 54 is in its inner position so that the pin 55 stands at the inner end of the slot 56. Inasmuch as the disk 1 represents cents; the disk 2, units and tens of dollars, and the disk 3, hundreds of dollars, the disks will show the sum of $2500.00. Suppose that this sum is to be discounted 20%, 20%, and 5%. The handle 4 will be rotated so as to make the three disks rotate as shown by the arrows that is, toward the rear of the machine. In order to have the disks disclose the sum remaining after the first discount of 20% has been deducted, the disk 3 must show "20" while the other disks show "00". In order to make "20" show on the disk 3, the said disk will have to rotate ⅕ of a revolution. In order that, when the disk 3 shows "20", the pointer 59 will point to "20" on the percentage disk 60, the pointer will also have to rotate ⅕ of a revolution. As the gear 44 now rotates only as fast as the disk 2, and as the disk 2 rotates fifty times as fast as the disk 3, it is clear that the gearing 58 will have to reduce the speed of the shaft 40 at the rate of 50 to 1. In turning the disks to disclose the "20" on the disk 3, the disk 2 has turned 10, and the disk 1 has turned 500, whole revolutions thus leaving the double zeros still exposed on these disks. During the rotation of the disk 3, the slot 56 has caused the pin 55 to move the block 54 towards the rear a certain distance. Before turning the crank 4 again, the lever 49 is depressed to remove the gear 44 from the face of the disk 2, whereupon the pointer 59 returns to zero, as already explained. The lever 49 is then released, and the gear 44 reengages the disk 2. The block 47 is then pushed rearwardly into engagement with the block 54. It will be understood that the gear 44 will now rotate slightly faster than the disk 2, the increased speed being dependent upon the shape of the slot 56. This slot is so shaped that as the pin moves rearwardly, the gear 44 will, when the blocks 47 and 54 are contiguous, cause the rotation of the pointer to increase in proportion to the degree the original sum of $2500.00 has been reduced after the 20% has been deducted. With the block 47 moved back against the new position the block 54 has assumed, it will be seen that, upon again rotating the handle 4 until the pointer again points to "20", the disk 3 will now have turned ⅕ of a revolution; it should now disclose the number "16" while the other disks show "00". In case the gear 44 had remained at its first position, the disk 3 would have turned another ⅕ of a revolution, disclosing the number "15", or $100 too much. It is clear that the disk 3 should turn only ⅘ as far to register the second 20% as it did to register the first 20% off. Consequently, the pointer 59 has to turn enough faster to make up for the reduction of the principal sum. The pointer is again returned to zero and the block 47 pushed back against the block 54. The handle 4 is again rotated until the pointer comes to "5", when the disk 3 will show the number "15", and the disk 2 the number "20", indicating that the amount remaining after the discounts have been taken out of the $2500.00 is $1520.00. When a new sum is to be discounted, the lever 36 is pushed to the rear to release the lever 33. The spring 39' will then separate the worm 27 from the worm wheel 28. The crank is rotated to bring the disk 3 with the hundreds of the new sum opposite the slot 73. The lever 49 is depressed and locked, the pointer returning to zero. The handle 4 is then rotated until the disk 2 shows the units and tens of the sum, and the disk 1, the cents. The worm 27 and the gear 44 are then released, and the sum remaining after the discounts have been deducted from the sum is obtained as when the $2500 was discounted. The block 47 must be pushed into contact with the block 54 before starting. In case the disk 2 should be rotated to indicate "50" or more, the rack teeth 64 would engage the pinion 63 and cause the pin 65 to push the slide 67 to the right and move the slot 69 over the 50 and to cover the left-hand row of figures on the disk. When the teeth 64 with the disk 2 again encounter the pinion 63, the pin 65 would push the slide 67 to the left, because the pin would engage the opposite wall of the slot 66 from the one first engaged. The slide will be pushed to the left after the "00" has been again disclosed and in time to disclose "01" as the disk 2 is further rotated.

Instead of returning the pointer 59 to zero after discounting for each per cent., the pointer could be advanced from its last station so as to indicate the sum of the preceding discounts and the discount being ascertained. Thus, after the pointer has been advanced to "20", it might be advanced to "40" to obtain the sum remaining after the second 20% has been deducted, and advance further to "45" to obtain the sum remaining after the discount of 5% has been taken off.

I claim—

1. In a discount machine, a percentage indicator, means for actuating it, a principal indicator connected to move simultaneously with the percentage indicator, and means for causing at a single operation the principal indicator to indicate, when the percentage indicator shows a certain per cent. of discount, the amount of the principal remaining when the discount shown by the percentage indicator has been deducted therefrom.

2. In a discount machine, a percentage indicator, a principal indicator, means for moving the indicators simultaneously, and means including co-acting adjustable face and edge engaging wheels for moving the percentage indicator at a rate which is faster in the proportion that the principal sum is less than a definite principal.

3. In a discount machine, a principal indicator, means for moving the same, a movable element connected to move simultaneously with the indicator, and means including a curved track for adjusting the relative rate of movement of the said indicator and the said element so that when the said element reaches a predetermined place, corresponding to the required discount, the indicator will disclose the discounted principal.

4. In a discount machine, a rotary disk having thereon numerals indicating certain principals, a percentage indicator, a speed change gear between the disk and the indicator, and means controlled by the disk for adjusting the speed of the indicator to a rate corresponding to the rate any principal bears to a certain principal.

5. In a discount machine, a rotary disk having thereon numerals indicating certain principals, a percentage indicator, a spiral path movable with the disk, a stop controlled in its movement by said spiral, and a speed change gear located between the disk and the indicator and having its position determined by the position of said stop, said spiral being so shaped as to move the said stop in proportion to the rate a certain principal on said disk diminishes during the rotation thereof.

6. In a discount machine, a rotary disk having thereon numerals indicating certain principals, a percentage indicator, a spiral path movable with the disk, a stop controlled in its movement by said spiral, a speed change gear located between the disk and the indicator and having its position determined by the position of said stop, said spiral being so shaped as to move the said stop in proportion to the rate a certain principal on said disk diminishes during the rotation thereof, and means for causing the gear to be adjusted to correspond to the successive positions of the stop.

7. In a discount machine, an indicator disk, a worm for rotating the same to change the indications during a discounting operation, a flexible shaft to support said worm, means for bending said shaft so as to disconnect the worm gearing, and means for rotating the disk after the worm gearing has been disconnected in order to set the disk for a new discount operation.

8. In a discount machine, a movable indicator having thereon two lines of indications one being the continuation of the other, means for disclosing one line of indications as the indicator is moved, and means for shifting the disclosing means so as to disclose the other line when the first line has been exhausted.

Signed at Pittsburg, Pa., this 2nd day of December, 1907.

CHESTER A. LONGWELL.

Witnesses:
 ALICE E. DUFF,
 ELVA STANICH.